United States Patent
Rolling et al.

(10) Patent No.: US 10,992,615 B2
(45) Date of Patent: Apr. 27, 2021

(54) DYNAMIC OPEN GRAPH MODULE FOR POSTING CONTENT ONE OR MORE PLATFORMS

(71) Applicant: Trusted Voices, Inc., Valley Village, CA (US)

(72) Inventors: Benjamin Rolling, Valley Village, CA (US); Ian Starnes, San Clemente, CA (US)

(*) Notice: Subject to any disclaimer, the term of this patent is extended or adjusted under 35 U.S.C. 154(b) by 0 days.

(21) Appl. No.: 16/824,577

(22) Filed: Mar. 19, 2020

(65) Prior Publication Data

US 2020/0220825 A1 Jul. 9, 2020

Related U.S. Application Data

(63) Continuation-in-part of application No. 15/829,121, filed on Dec. 1, 2017, now abandoned.

(51) Int. Cl.
*H04L 12/58* (2006.01)
*G06Q 50/00* (2012.01)
*G06F 16/955* (2019.01)

(52) U.S. Cl.
CPC ........ *H04L 51/066* (2013.01); *G06F 16/9566* (2019.01); *G06Q 50/01* (2013.01); *H04L 51/046* (2013.01); *H04L 51/10* (2013.01); *H04L 51/32* (2013.01); *H04L 51/36* (2013.01)

(58) Field of Classification Search
CPC ......... H04L 51/10; H04L 51/32; H04L 51/36; H04L 51/046; H04L 51/066; H04L 65/00; H04L 51/18; H04M 3/5307; G06F 16/9566; G06Q 50/01
See application file for complete search history.

(56) References Cited

U.S. PATENT DOCUMENTS

| | | | | |
|---|---|---|---|---|
| 9,152,729 | B2* | 10/2015 | Ajoku | G06F 16/9566 |
| 9,558,283 | B2* | 1/2017 | Novotny | G06F 16/955 |
| 9,792,285 | B2 | 10/2017 | Reiley et al. | |
| 9,898,519 | B2* | 2/2018 | Peri | G06F 16/275 |
| 9,965,129 | B2 | 5/2018 | Reiley et al. | |
| 10,063,600 | B1* | 8/2018 | Marsh | H04N 21/2743 |
| 10,217,157 | B2* | 2/2019 | Novotny | G06Q 30/0271 |
| 10,291,573 | B2 | 5/2019 | Ravishankar et al. | |

(Continued)

FOREIGN PATENT DOCUMENTS

| | | | | |
|---|---|---|---|---|
| WO | WO-9832272 A1 * | 7/1998 | ............ | H04L 51/00 |
| WO | WO-2015199778 A1 * | 12/2015 | ............ | G06Q 50/01 |
| WO | WO-2016183111 A1 * | 11/2016 | ......... | H04L 63/0815 |

OTHER PUBLICATIONS

The Open Graph protoco—https://ogp.me/ (Year: 2010).*
Kostas J Katsikis, "Non-Final Office Action", dated Oct. 4, 2019, U.S. Appl. No. 15/829,121.

*Primary Examiner* — Kostas J Katsikis
(74) *Attorney, Agent, or Firm* — LeonardPatel

(57) ABSTRACT

A computer-implemented method for posting content from an external source and onto one or more platforms includes receiving content from a computing device and analyzing the content to generate rich metadata. The method also includes rendering the content in one or more formats acceptable to the one or more platforms. The method further includes transmitting a uniform resource location (URL) for the rendered content to the one or more platforms to allow the one or more platforms to post the rendered content by way of the URL.

20 Claims, 12 Drawing Sheets

(56) References Cited

U.S. PATENT DOCUMENTS

| | | | |
|---|---|---|---|
| 10,296,644 B2* | 5/2019 | Zhou | G06F 16/951 |
| 10,713,308 B2* | 7/2020 | Khalkechev | G06F 16/248 |
| 10,817,145 B1* | 10/2020 | Bourgeois | G06F 3/04842 |
| 2010/0082693 A1 | 4/2010 | Hugg et al. | |
| 2011/0119220 A1* | 5/2011 | Seolas | G06F 16/957 |
| | | | 706/47 |
| 2011/0320373 A1 | 12/2011 | Lee et al. | |
| 2013/0014136 A1 | 1/2013 | Bhatia et al. | |
| 2013/0030909 A1 | 1/2013 | Shih et al. | |
| 2013/0091118 A1* | 4/2013 | Ajoku | G06F 16/9566 |
| | | | 707/709 |
| 2013/0132823 A1* | 5/2013 | Sutic | G06F 40/117 |
| | | | 715/234 |
| 2013/0204664 A1 | 8/2013 | Romagnolo et al. | |
| 2013/0311907 A1 | 11/2013 | Goldsmith et al. | |
| 2013/0325869 A1 | 12/2013 | Reiley et al. | |
| 2013/0326406 A1 | 12/2013 | Reiley et al. | |
| 2014/0006930 A1 | 1/2014 | Hollis et al. | |
| 2014/0032332 A1* | 1/2014 | Atli | G06Q 50/01 |
| | | | 705/14.66 |
| 2014/0081913 A1* | 3/2014 | Peri | G06Q 50/01 |
| | | | 707/610 |
| 2014/0189731 A1* | 7/2014 | Emerson, III | H04L 67/10 |
| | | | 725/34 |
| 2014/0222911 A1* | 8/2014 | Haugen | H04L 67/22 |
| | | | 709/204 |
| 2014/0280537 A1 | 9/2014 | Pridmore et al. | |
| 2014/0282096 A1 | 9/2014 | Rubinstein et al. | |
| 2015/0154654 A1* | 6/2015 | Sbiti | G06Q 50/01 |
| | | | 705/14.7 |
| 2015/0213001 A1 | 7/2015 | Levy et al. | |
| 2015/0288645 A1* | 10/2015 | Gianattasio | H04H 20/53 |
| | | | 709/206 |
| 2016/0007083 A1 | 1/2016 | Gurha | |
| 2016/0036756 A1 | 2/2016 | Jorgenson | |
| 2016/0283593 A1* | 9/2016 | Zhou | G06F 16/951 |
| 2016/0359957 A1 | 12/2016 | Laliberte | |
| 2017/0118161 A1 | 4/2017 | Ravishankar et al. | |
| 2017/0193075 A1 | 7/2017 | Hegelich et al. | |
| 2017/0201482 A1 | 7/2017 | Ravishankar et al. | |
| 2018/0039627 A1 | 2/2018 | Reiley et al. | |
| 2018/0253173 A1 | 9/2018 | Reiley et al. | |
| 2018/0285818 A1 | 10/2018 | Soltani | |
| 2018/0349485 A1 | 12/2018 | Carlisle et al. | |
| 2018/0367580 A1* | 12/2018 | Marsh | H04L 65/1089 |
| 2019/0173827 A1 | 6/2019 | Rolling et al. | |
| 2019/0259107 A1 | 8/2019 | Hollis et al. | |

* cited by examiner

DYNAMIC OPEN GRAPH MODULE FOR POSTING CONTENT ONE OR MORE PLATFORMS

CROSS-REFERENCE TO RELATED APPLICATION

This application claims the benefit of Non-Provisional application Ser. No. 15/829,121, filed on Dec. 1, 2017. The subject matter thereof is hereby incorporated herein by reference in its entirety.

FIELD

The present invention relates to online social media, and more particularly, posting of content from an external source and onto one or more social media platforms.

BACKGROUND

Current platforms that post content to social media platforms fail to recognize which platform is posting to. Further, the current platforms take the received content, and post the received content into the platform without modifying the format and/or metadata. These platforms also fail to consider the type of content that is viewed by users of a social media platform. Furthermore, this content fails to include metadata that helps the content to be identified and curated.

Some technologies utilize short uniform resource locators (URLs) to deliver content and capture click throughs. This does not, however, correct the problem of delivering the right kind of content for the platform and audience. This approach also creates additional complications with analytics and corrupts the source of the content for most platforms.

Thus, an alternative process for identifying the appropriate platform may be more beneficial.

SUMMARY

Certain embodiments of the present invention may provide solutions to the problems and needs in the art that have not yet been fully identified, appreciated, or solved by current social media platforms. For example, some embodiments generally pertain to posting content from an external source and onto one or more social media platforms.

In an embodiment, a computer-implemented method may include receiving content from a computing device and analyzing the content to generate rich metadata. The method also includes rendering the content in one or more formats acceptable to the one or more platforms. The method further includes transmitting a URL for the rendered content to the one or more platforms to allow the one or more platforms to post the rendered content by way of the URL.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

"Posting" content onto a social media platform has long been the norm. To handle posting or displaying of external content in a social media platform, the social media platform outlines metadata such as "open graph" or their own proprietary metadata. This metadata not only adds context such as author, content type, etc., but also instructs the platform how to display the content.

Each platform may require a combination of metadata to display the content correctly. This combination may include truthful analytics, dynamic content, automated intelligent tagging, video tagging, live video conversation analysis, and the availability to override graph data.

Truthful Analytics

Platforms may use metadata to identify the original source, causing incorrect analytics. For example, the engine may insert a different source when the platform is requesting the content for metadata versus when the platform is being requested for rendering.

Dynamic Content

Content is automatically rendered and cached into different formats, so the best content format is available for the requesting platform.

Automated Intelligent Tagging

Content tags are generated by machine learning and computer vision. By combining known context of the content from the supplied metadata and applying computer vision interpretation through a machine learning engine, we can come up with more "trusted" information about the content that can be used for both internal and external keyword/tag generation.

Video Tagging

Video tagging may include an algorithm that intelligently analyzes video frames for sufficient changes before performing the automated intelligent tagging. These changes typically involve major KEYFRAME deltas. This may be critical in the real-time nature of social media posting where time is critical. This also lends great importance to the easy consumption and distribution of live video streams for later consumption.

Live Video Conversation Analysis

By analyzing a social media conversation around a live stream in conjunction with voice to text and computer vision based machine learning, small, easy to consume clips may be created in close to real-time of live events and automatically post those.

Ability to Override Graph Data

By hosting the graph data directly, the engine allows an operator to replace default image, description, keywords, and destination uniform resource locator (URL) in the hosted graph data without requiring a change on the destination URL's page source.

Figure 1:
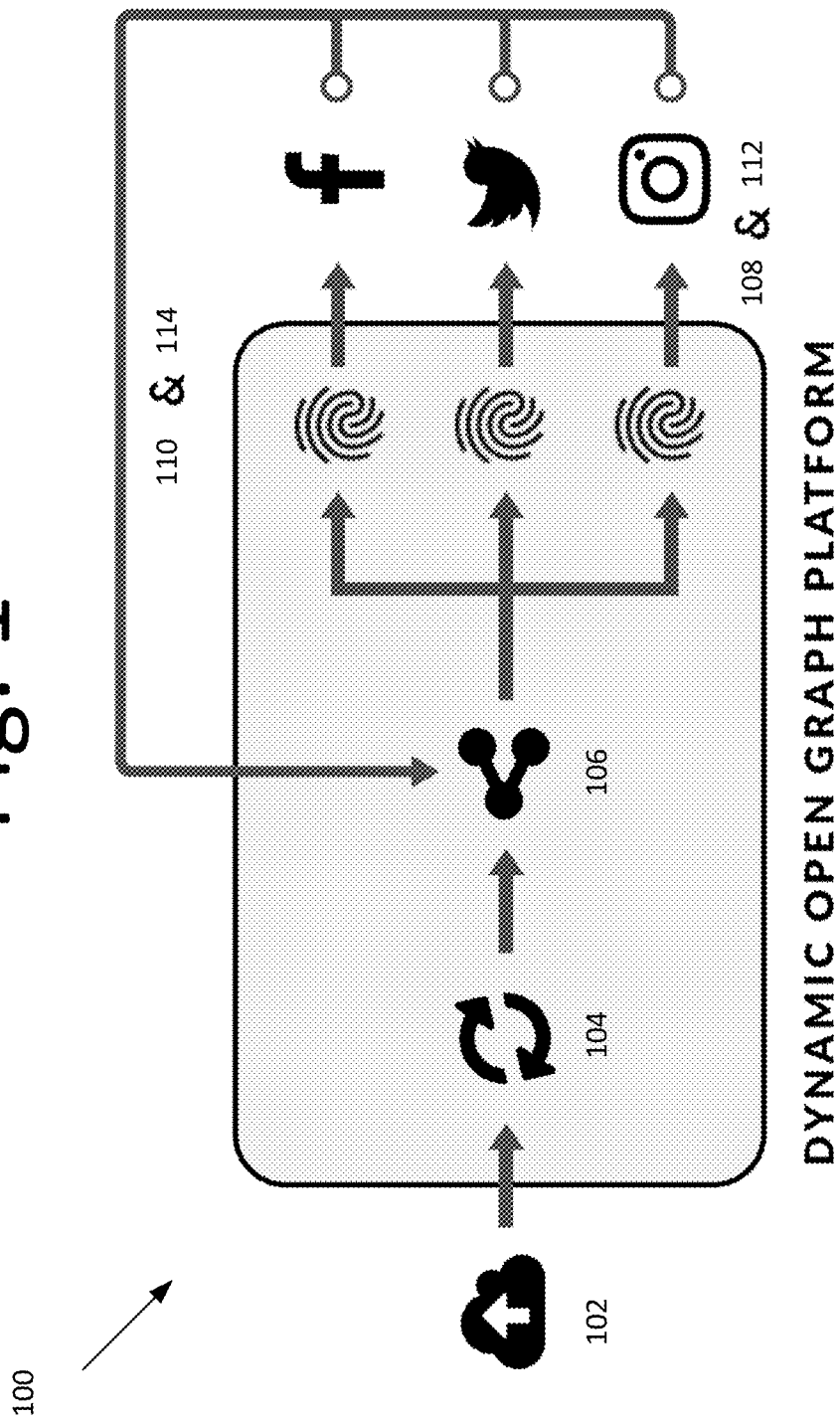
FIG. 1 is a workflow illustrating a dynamic open graph (DOG) platform for sharing content to external social platforms, according to an embodiment of the present invention.

FIG. 1 is a workflow diagram 100 illustrating a DOG platform for sharing content to external social platforms, according to an embodiment of the present invention. In workflow 100, a user uploads content to the DOG platform at 102. In response, the DOG platform performs intelligent media consumption at 104.

Intelligent media consumption may provide two functions. First, the incoming content is analyzed to automatically generate rich metadata. Second, the content in various formats is rendered to allow the most appropriate format per social platform and audience to be delivered. Analyzing the content and generating rich metadata via machine learning allows for users to quickly post content without having to worry about filling in metadata.

At 106, the content is shared to external social platforms, such as Facebook™ Twitter™, LinkedIn™, etc., by way of the DOG platform. At 108, the DOG platform generates a unique content URL for each platform, and posts the unique content URL to each platform.

At 110, the DOG platform analyzes the incoming requests using the unique content URLS. These requests may be from a platform, such as Twitter™, attempting to parse the graph data for this content, or a user clicking the content on a platform, such as Twitter™, to view the content.

At 112, the DOG platform returns the most optimal open graph data for the requesting external social platform. For example, the DOG platform may determine that the content being requested from a platform, such as Facebook™, would be best delivered as a video. However, for another platform such as Twitter™, the DOG platform may determine that the same content should be delivered as an animated GIF. In other words, the DOG platform may deliver different content and graph data based on the requesting platform. In another embodiment, when a user attempts to view the content with the same URL, the DOG platform may redirect the user to the social media platform that is most suitable for his or her device. This way, the user can view the content that is most suitable for his or her device (e.g., mobile, desktop, etc.).

At 114, the DOG platform continuously monitors externally shared content via "live conversation analysis". For example, the DOG platform may analyze the "conversation" such as comments, likes, reshares, retweets, and moods. This analysis determines how well content is being accepted, and allows operators to change the tone and subject of future posts based on that feedback. The feedback may be provided using raw data or provided using suggestions made through the interface.

Figure 2:
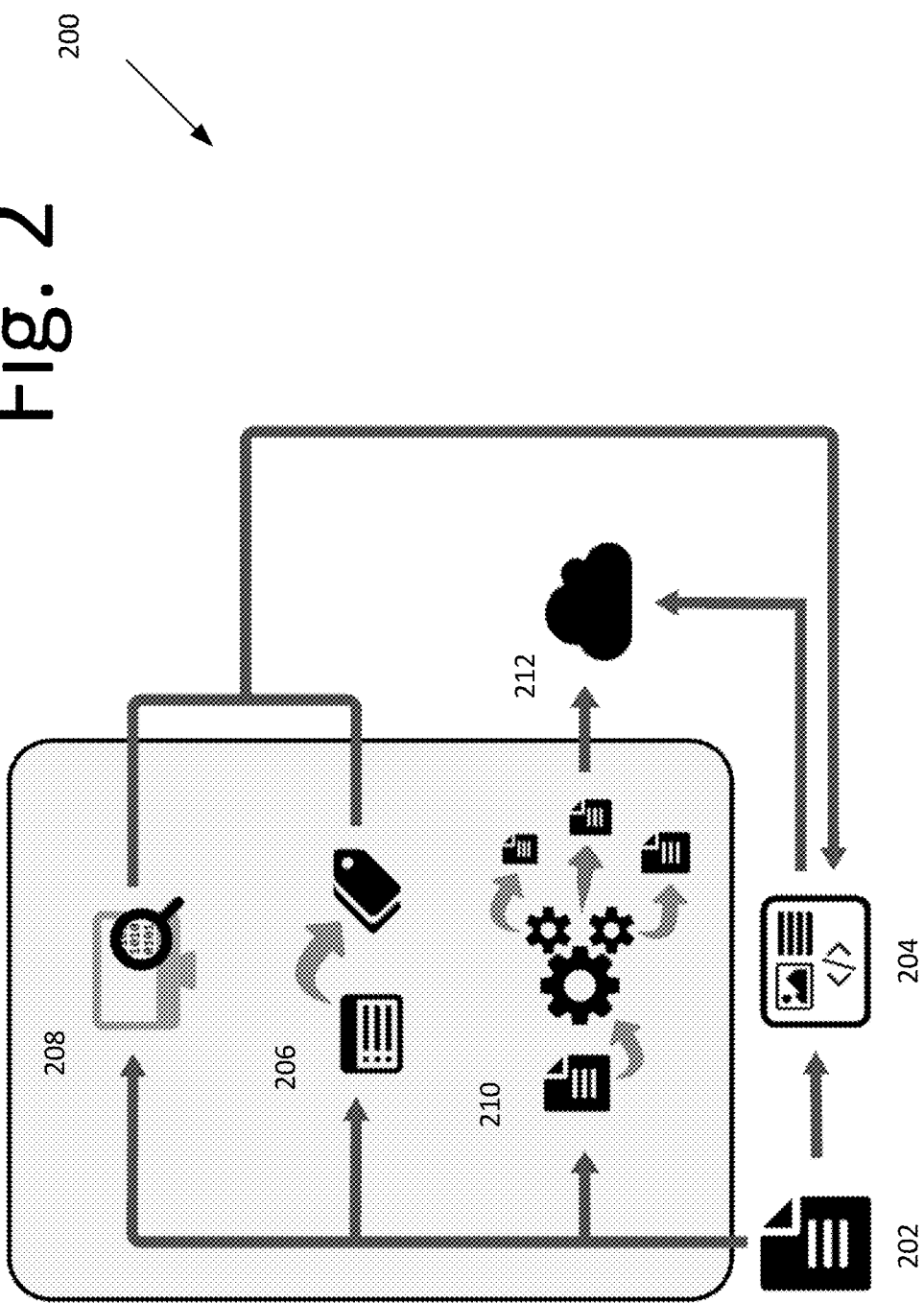
FIG. 2 is a workflow illustrating media consumption for a document, according to an embodiment of the present invention.

FIG. 2 is a workflow 200 illustrating media consumption for a document, according to an embodiment of the present invention. In this embodiment, workflow 200 may begin at 202 with identifying and integrating the media for "document" type. At 204, the content container is generated. In some embodiments, the content container provides an overarching container for the content and all the sub-content that may be generated from it.

At 206, the metadata is extracted for title, author, location, type, keywords, etc. At 208, the extracted media is run through object detection and facial recognition. It should be noted that analyzing the content and generating rich metadata via machine learning allows for users to quickly post content without having to worry about filling in metadata. This metadata can be crucial in understanding the correct audience for the type of content before posting, and analyzing how posted content has performed and why.

At 210, the PDF and thumbnail renditions are generated, and at 212, the renditions are pushed to a content delivery network (CND) for faster delivery to the end user. Referring to 210, the document is converted into PDF, HTML, and various size thumbnail images for each page. These renditions are pushed to a CDN for faster delivery to the end user. This allows the user to quickly post the content in the future without having to generate these renditions when posting to social media platforms.

Figure 3:
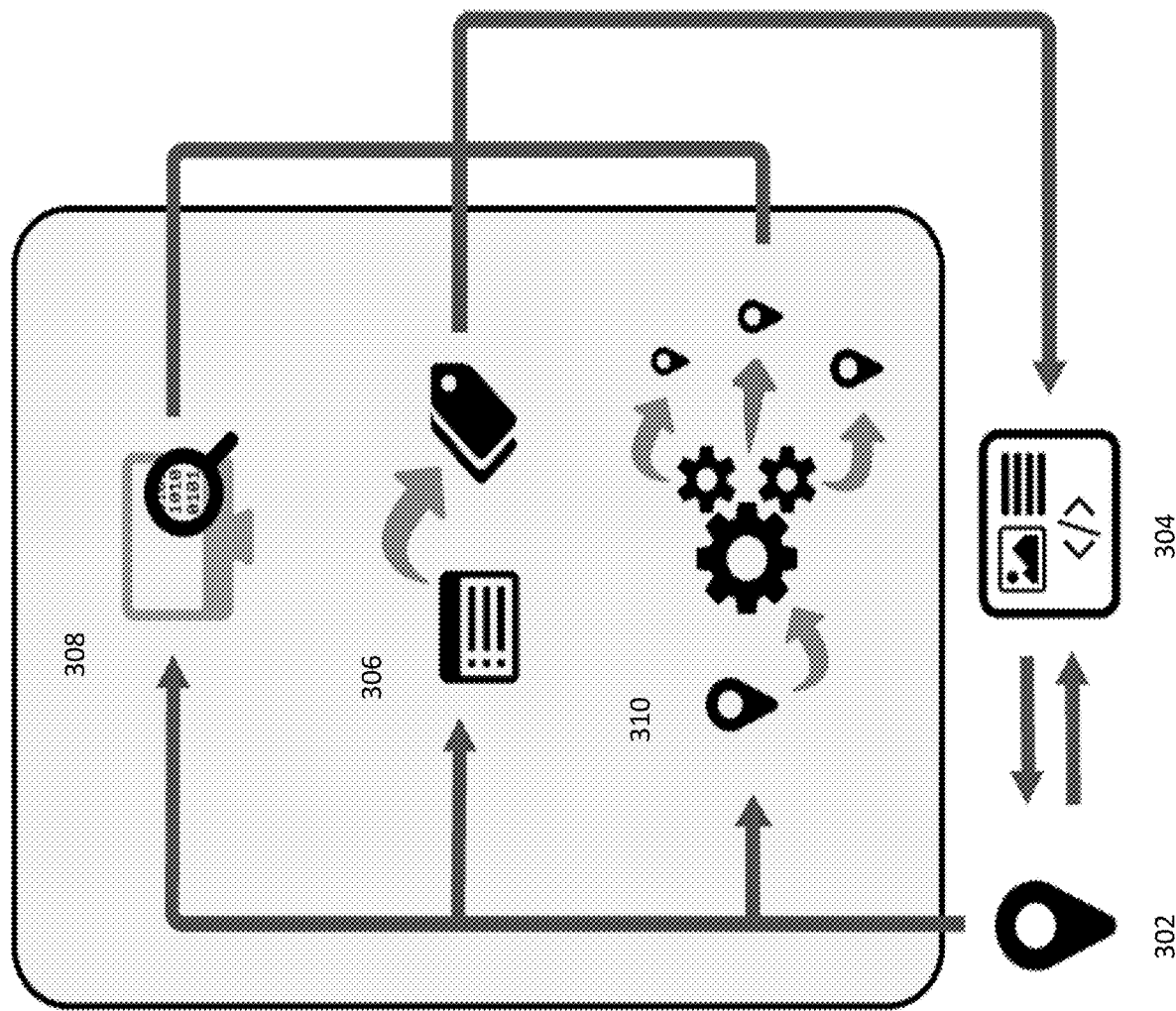
FIG. 3 is a workflow illustrating media consumption for a map, according to an embodiment of the present invention.

FIG. 3 is a workflow 300 illustrating media consumption for a map, according to an embodiment of the present invention. In this embodiment, workflow 300 may begin at 302 with identifying and integrating the media for "map" type such as Google™ maps. At 304, a content container is generated, and at 306, metadata is extracted for title, author, location, type, keywords, etc. At 308, a geolocation meta engine is ran for details on location, local businesses, parks, etc. Location may be defined by categories, airports, parks, store, restaurants, etc. Facial recognition and object detection are also performed on images contained within the extracted metadata. At 310, a mini map thumbnail of the location is generated. In some embodiments, up to 20 local images are retrieved from Google™ and rendered into various sizes and formats.

Figure 4:
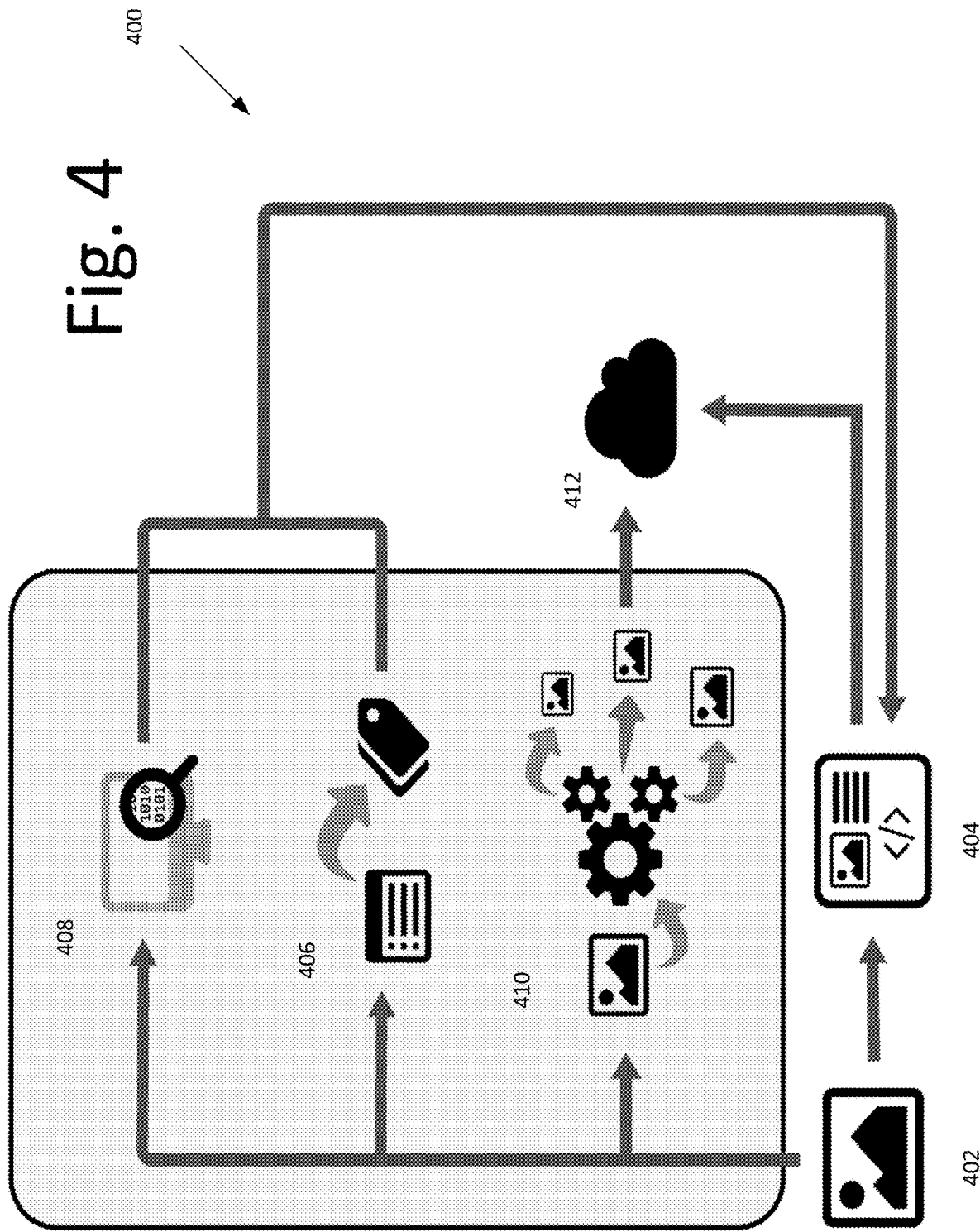
FIG. 4 is a workflow illustrating media consumption for an image, according to an embodiment of the present invention.

FIG. 4 is a workflow 400 illustrating media consumption for an image, according to an embodiment of the present invention. In this embodiment, workflow 400 may begin at 402 with identifying and integrating media for an "image" type. At 404, a content container is generated, and at 406, metadata is extracted for title, author, location, type, keywords, etc. At 408, object detection and facial recognition are performed, and at 410, multiple renditions in different image formats and sizes are rendered. This may also include sub images of detected faces and objects. At 412, all renditions are pushed to the CDN for faster delivery to the end user.

Figure 5:
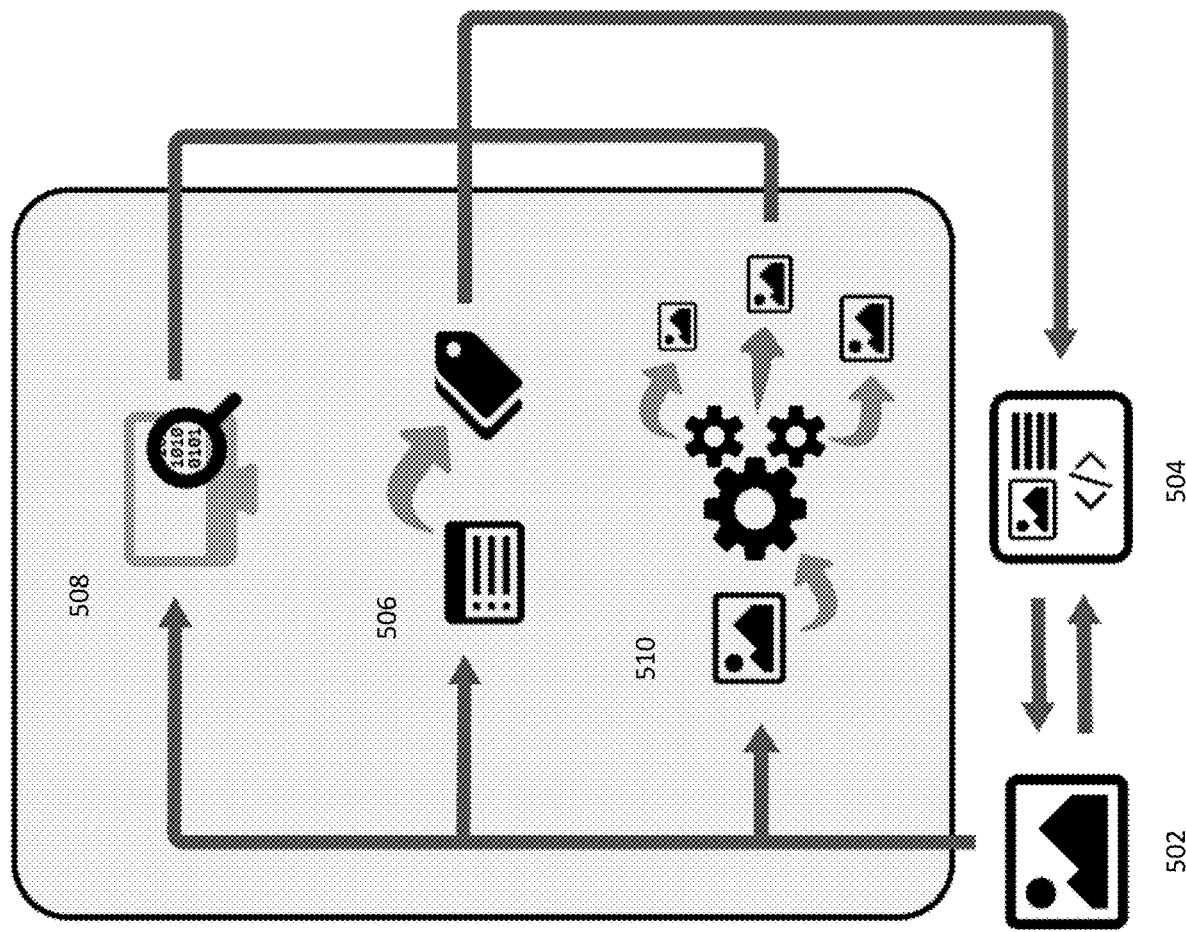
FIG. 5 is a workflow illustrating media consumption for media, according to an embodiment of the present invention.

FIG. 5 is a workflow 500 illustrating media consumption for media, according to an embodiment of the present invention. In this embodiment, workflow 500 may begin at 502 with identifying and integrating media for "media" type. At 504, a content container is generated, and at 506, metadata is extracted for title, author, location, type, keywords, etc. At 508, media is fetched, and object detection and facial recognition are performed thereto. In some embodiments, the end user is linked to the source URL. At 610, one or more thumbnail renderings of the media are generated.

Figure 6:
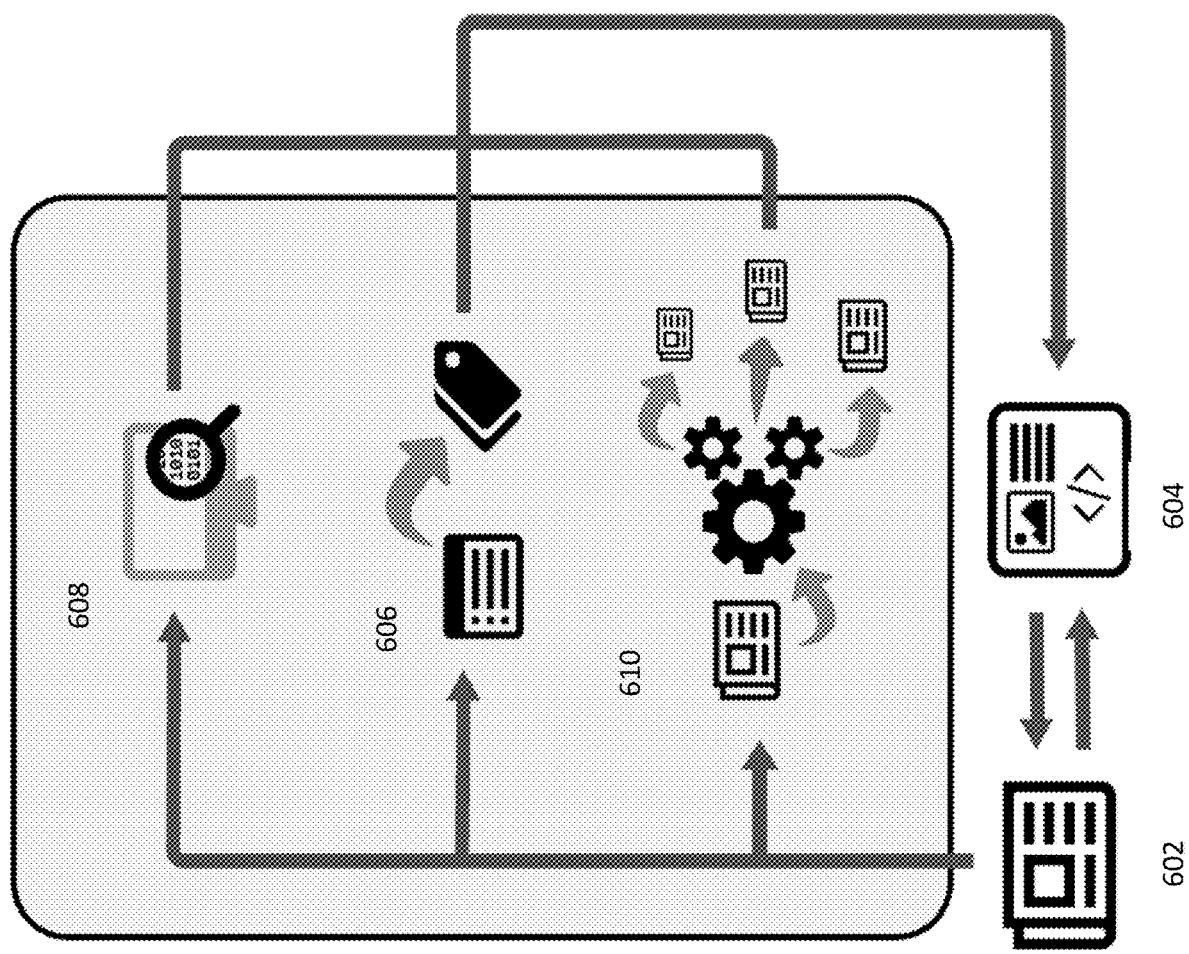
FIG. 6 is a workflow illustrating media consumption for a news article, according to an embodiment of the present invention.

FIG. 6 is a workflow illustrating media consumption for a news article, according to an embodiment of the present invention. In this embodiment, workflow 600 may begin at 602 with identifying and integrating media for "URL" type. At 604, a content container is generated, and at 606, metadata is extracted for title, author, location, type, keywords, etc. In some embodiments, a summary may be generated if a summary does not already exist. At 608, media is extracted, and object detection and facial recognition are performed thereto. In some embodiments, the content analysis engine may determine if content matches keywords, and may generate more weighted keywords. In some further embodiments, the end user is linked to the source URL. At 610, one or more thumbnail renderings of the media are generated.

Figure 7:
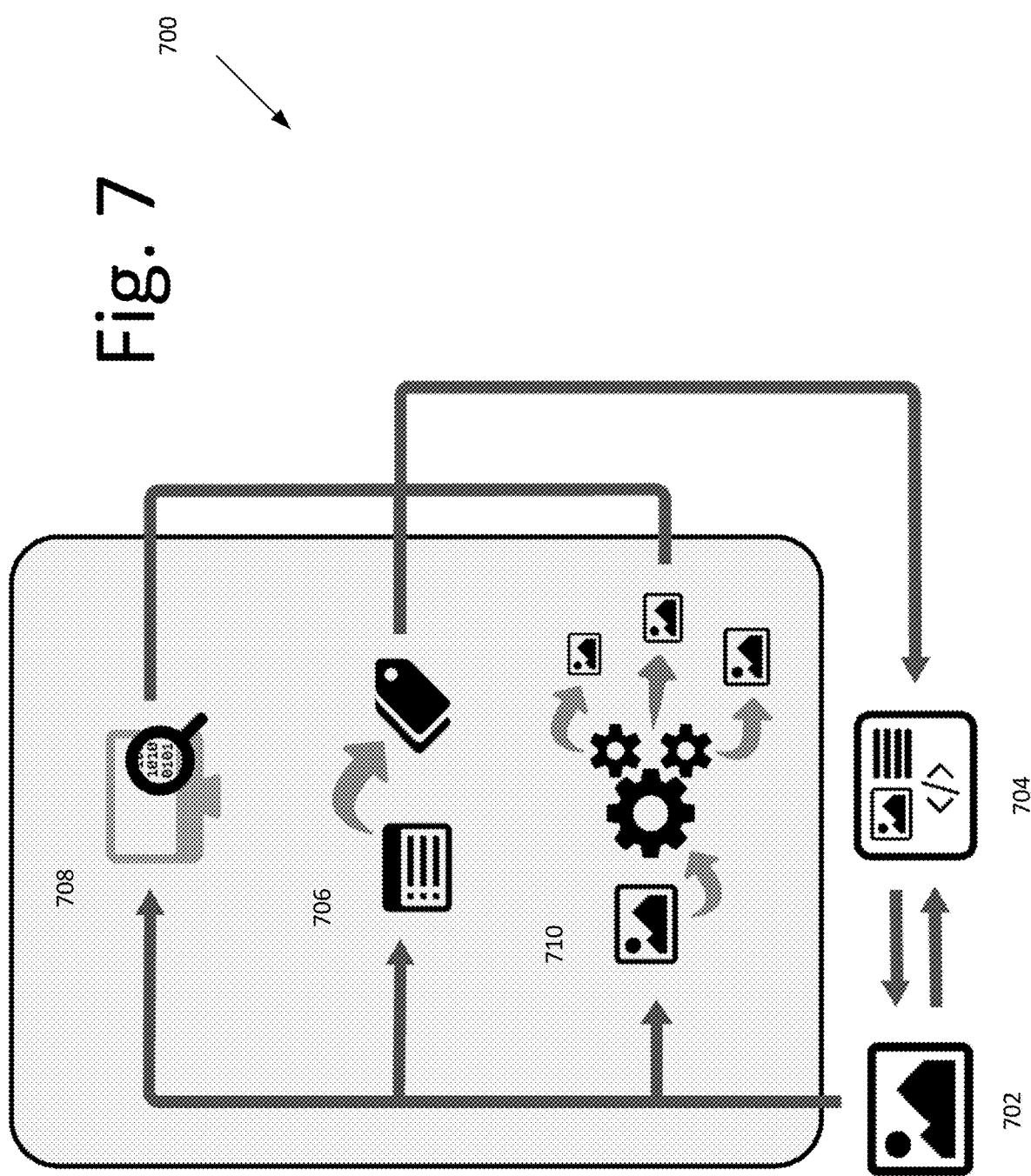
FIG. 7 is a workflow illustrating media consumption for social media, according to an embodiment of the present invention.

FIG. 7 is a workflow 700 illustrating media consumption for social media, according to an embodiment of the present invention. In some embodiments, workflow 700 may begin at 702 with identifying and integrating the media for "media" type. At 704, a content container is generated, and at 706, content is scraped externally. The results of which are sent through special parsers for metadata. At 708, object detection and facial recognition are performed on scraped content, and the end user is linked to the source URL. At 710, one or more thumbnail renders of scraped content are generated.

Figure 8:
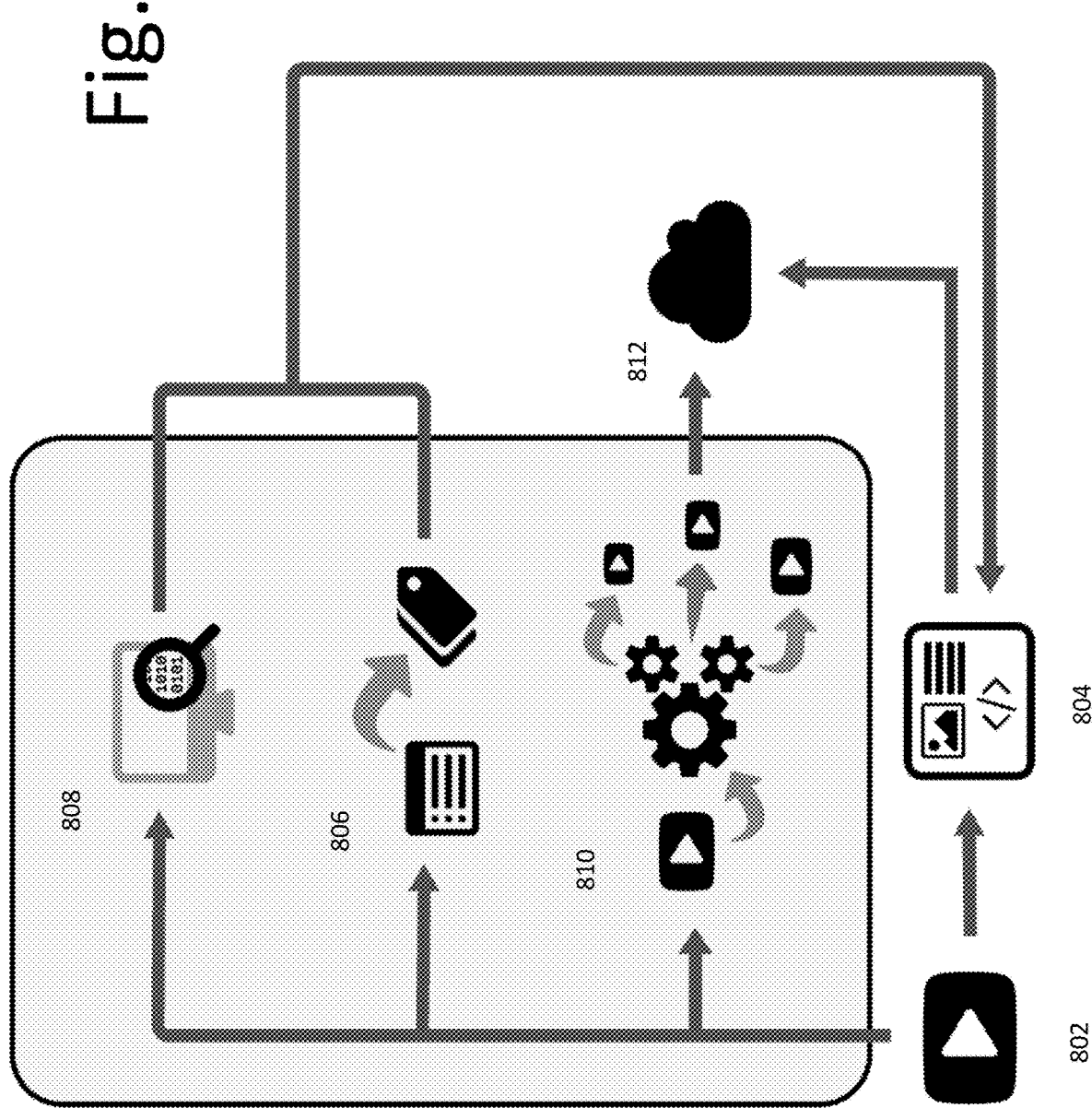
FIG. 8 is a workflow illustrating media consumption for a video, according to an embodiment of the present invention.

FIG. 8 is a workflow 800 illustrating media consumption for a video, according to an embodiment of the present invention. In some embodiments, workflow 800 may begin at 802 with identifying and integrating media for "video" type. At 804, a content container is generated, and at 806, metadata is extracted for title, author, location, type, keywords, etc. At 808, location (if available) is analyzed by way of a geolocation meta engine. At every major keyframe change, the frame is analyzed for computer video object detection. For example, one or more objects may be given weight by percentage of appearance, confidence in detection, and objects of similar categories, and facial detection is performed to detect "actors" or famous people. At 810, animated GIFS are generated for up to 60 seconds of video. In some embodiments, multiple quality and formats of video renditions are generated. Every major keyframe change generates a "preview thumbnail" for scrubbing. At 812, all renditions are pushed to the CDN for faster delivery to the end user.

Figure 9:
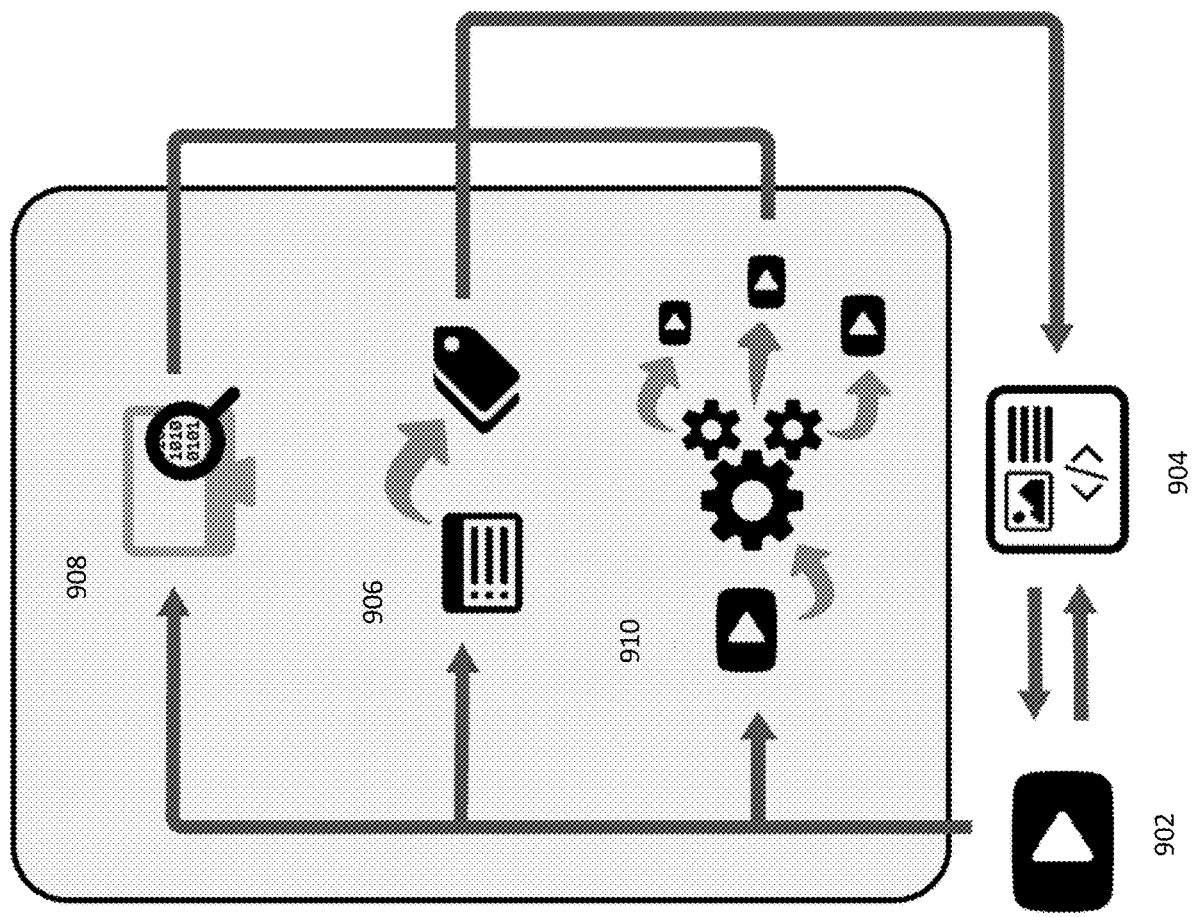
FIG. 9 is a workflow illustrating media consumption for a YouTube™ video, according to an embodiment of the present invention.

FIG. 9 is a workflow 900 illustrating media consumption for a YouTube™ video, according to an embodiment of the present invention. In some embodiments, workflow 900 may begin at 902 with identifying and integrating media for "video" type. At 904, a content container is generated, and at 906, metadata is extracted for title, author, location, type, keywords, etc. At 908, video is fetched, and object detection and facial recognition are run. In some embodiments, end user playback is linked to the source URL. At 910, thumbnail renders of fetched video are generated.

Dynamic Open Graph

Some embodiments generally pertain to DOG, which enables one or more webpages to become a rich object in a social graph. To understand DOG, when sharing content to a social platform, the content is typically uploaded directly to that social platform. A URL, for example, may be provided that links back to the original content or a user's homepage.

When sharing just a URL to a platform, the platform sends out a request using a platform specific user-agent to the URL host. This request is intercepted by DOG and manipulated to serve specifically rendered content to this platform. If the request comes through without a known social platform, DOG allows the request to proceed to the source content as normal. In other words, DOG addresses the handling of platform specific content requests.

Figure 10:
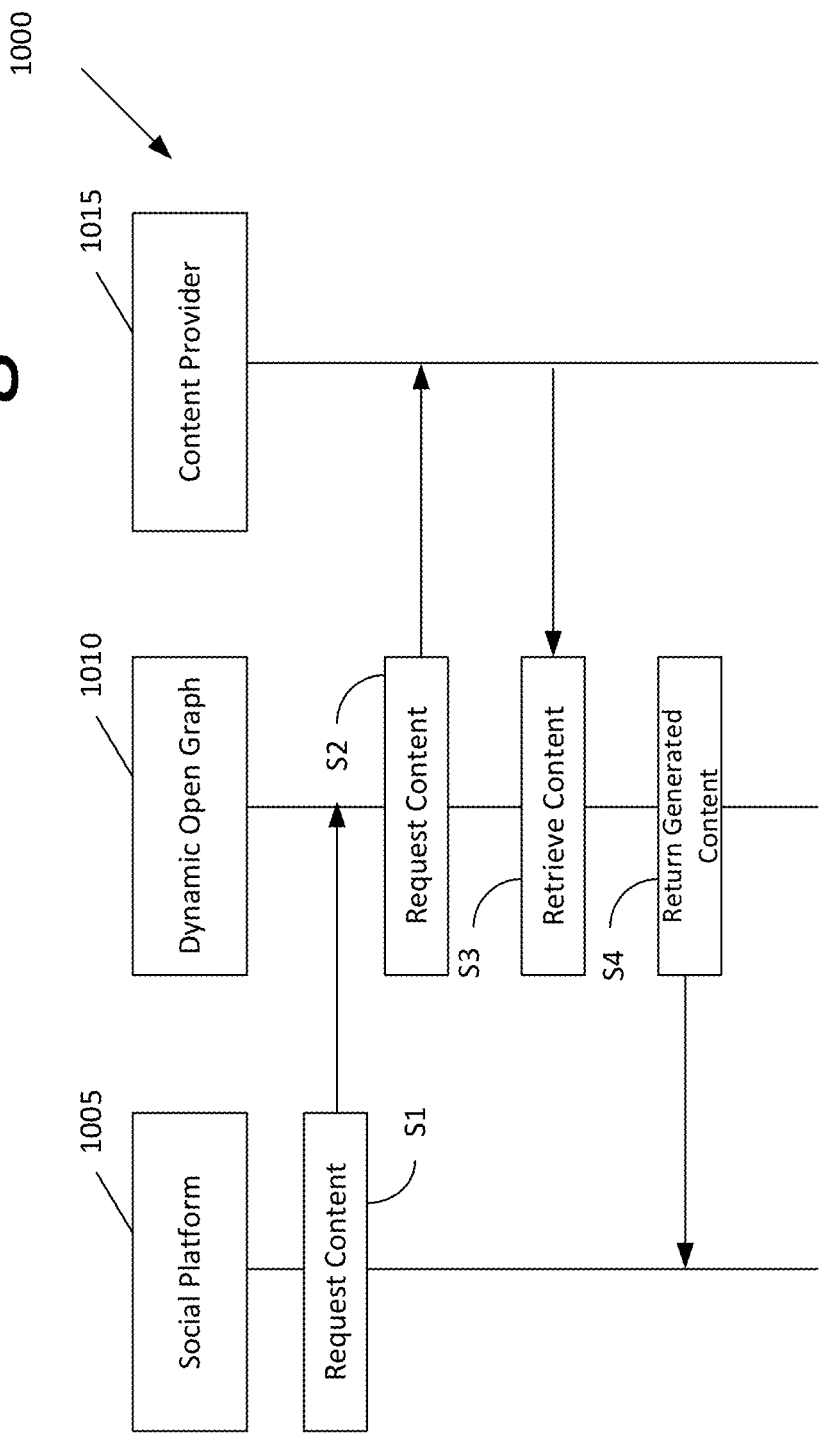
FIG. 10 is a flow diagram illustrating a process for generating open graph data, according to an embodiment of the present invention.

FIG. 10 is a flow diagram illustrating a process 1000 for generating open graph data, according to an embodiment of the present invention. In some embodiments, process 1000 begins with social platform 1005 requesting for content at 51. The request for content includes a URL of the content, in some embodiments. DOG 1010 intercepts this request and uses the URL to determine the requesting platform, and also, checks its cache (or database) for the content for that requesting platform.

When the content is not cached, DOG 1010 at S2 forwards the requests to the source (or content provider 1015). At S3, the content is returned from content provider 1015 to DOG 1010. DOG 1010 determines the content type, and generates open graph data for the requesting platform 1005. In some embodiments, DOG 1010 analyzes the platform and content type and generates the ideal open graph for the requesting platform 1005. For example, a YouTube™ video is not cached in DOG 1010; but on certain requesting platforms, DOG 1010 may serve an animated GIF cache for previewing. At S4, DOG 1010 return the generated open graph data to requesting platform 1005 for display.

Figure 11:
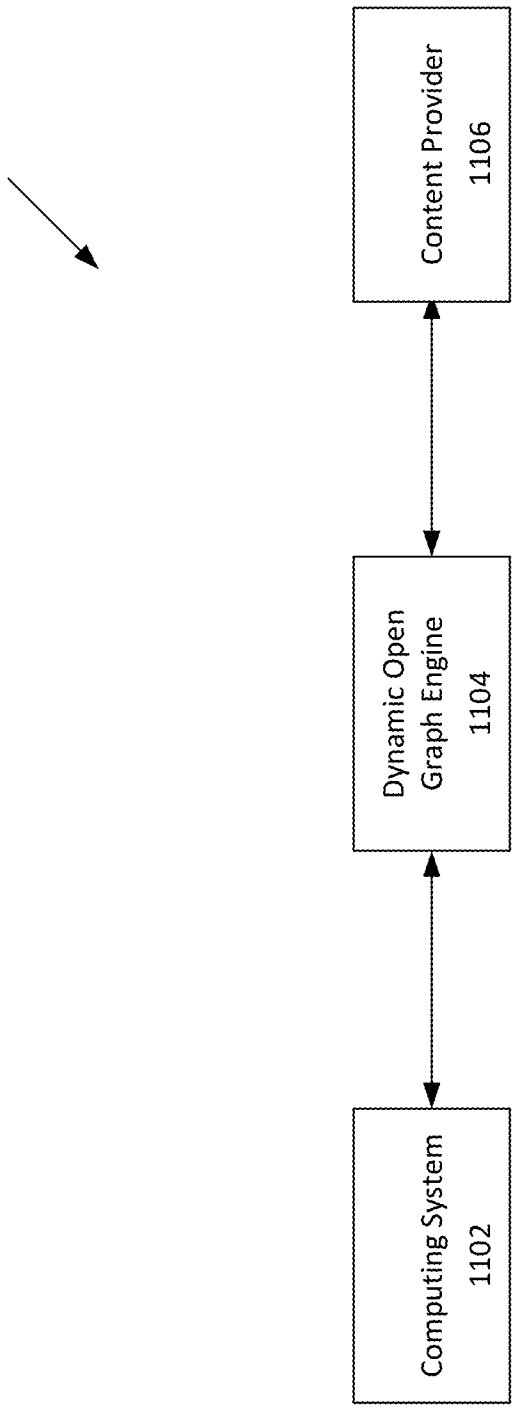
FIG. 11 is a block diagram illustrating a DOG content generation system configured open graph data, according to an embodiment of the present invention.

FIG. 11 is a block diagram illustrating a DOG content generation system 1100 configured open graph data, according to an embodiment of the present invention. To generate open graph data, the user of a computing device 1102 uploads his or her content to a DOG engine. The content may be any type of media, document, or event in the form of a URL. The DOG engine 1104 in turn generates a unique URL for the same content to track how it is being shared by different people.

URL

In some embodiments, when a URL is posted to DOG engine 1104, a request is automatically made from DOG engine 1104 to analyze the URL content. For example, DOG engine 1104 submits a request to the URL in order to pull the content. In this example, DOG engine 1104 extracts metadata from the pulled content and analyzes the text for keywords. In some further embodiments, DOG engine 1104 also analyzes additional URLs in the content for media files, processing them through media file content rules. When the URL points to a media file, DOG engine 1104 saves the media file in cache or a local database and processes the media file as media file content.

URL Proxy

When a URL is processed, the URL is identified where the original platform should still be the final destination when a user is viewing the content. DOG engine 1104 may intercept requests for this content, and when a user request is identified, DOG engine 1104 may proxy the request to the original URL. In other words, DOG engine 1104 intercepts the request and forwards this request to content provider 1106 to retrieve the content. This allows DOG engine 1104 to track analytics, and control how the content is previewed on shared platforms.

In some embodiments, DOG engine 1104 tracks analytics in two ways. In one example, DOG engine 1104 may track each request to a given URL based on the source platform, device, etc., and what type of media/open graph was served for that request. If DOG engine 1104 handled the posting of the content onto the platform, DOG engine 1104 may retrieve that platforms engagement data for that content.

Analytics may include a breakdown of each request, source platform, browser, device, and geolocation. This may be tied with the sharers own social metadata and metric.

Media File Content

Based on the media type, DOG engine 1104 extracts relevant metadata. In some embodiments, relevant metadata includes images, audio, video, and text document. Under images, exchangeable image file format (Exif) and other metadata is extracted with machine learning (ML) technology being utilized to abstract objects and faces from the images. Under audio, a transcript is generated via speech-to-text technology, allowing for the text to be parsed for keywords. Under video, metadata is parsed from the video file and the audio is processed by way of one or more audio rules. Furthermore, keyframes are processed through image rules. Under text document, the text is converted into plain text and processed for keywords. Furthermore, metadata is extracted from, images may be processed through image rules, and URL are processed through one or more URL rules.

Media Rendering

In some embodiments, DOG engine 104 creates a plurality of renditions based on content analysis. These renditions may be different media types from the original content and/or may be different in file size. In one example, a video may have an image created, an animated GIF, and a transcript document. These renditions may be used to preview content on different sharing platforms. For example, one platform uses an image, while another platform uses an animated GIF.

Media References

In an embodiment, DOG engine 104 returns references of each rendition to the content record. These references may be in the form of URLs to the rendered media in the DOG content delivery network (CDN) or inlined base64 rendering.

Unique URL Return

In certain embodiments, DOG engine 104 generates unique URL referencing the content record. The content poster may create as one or more unique URLs referencing the content record desired for more precise tracking.

Sharing the Content

Now that content is prepared and the one or more unique URLs are associated with the content by DOG engine 104, the content is shared on one or more mediums without limitations. For example, mediums may include email, chat, or a platform, which allows posting of the URL. Once the URL is shared, each time the request is submitted, DOG engine 104 determines the best response to the request.

Content Requested Via URL

In some embodiments, a request is submitted via a shared URL to DOG engine 104 for the content, when a platform or a user attempts to retrieve content.

Content Record Request

In some embodiments, DOG engine 104 parses the unique URL, which identifies the content being requested, and the analytics are recorded for the unique URL. The analytics record may be updated for this unique URL in some embodiments.

Content Record Retrieved

In some embodiments, the content record may be retrieved and updated, i.e., the analytics record for a particular unique URL is updated.

Requesting Platform Identification

In some embodiments, each URL requests contains a user-agent variable identifying the requesting platforms. Using the user-agent variable, DOG engine 104 may differentiate between one or more platforms and clients such as an email client, a web browser, Facebook™, Twitter™, and the like.

Request Platform Rules

Based on the identified platform, DOG engine 104 may request preset rules to handle the content record for the requesting platform.

Return Platform Rules

In some embodiments, the rules that are returns instruct DOG engine 104 as to what type of response is to be returned.

Process Rules

It should be appreciated that there are three types of core response DOG engine 104 may provide. This includes return DOG, return media, and return media via proxy.

For return DOG, when this rule is applied, this rule means that the sharing platform is requesting the content. In response, DOG engine 104 may return a webpage with dynamically generated open graph data (or relevant metadata). This data is tailored for the requesting platform and the ideally selected media rendition for this platform and content.

Under return media, this rule is applied when it is determined that a user requesting to view the content. This can be direct via URL or via a platform such as Facebook™, that is requesting the content for viewing.

Under return media via proxy, this rule is applied when it is determined that the content is best viewed via tis originally hosted platform. For example, a YouTube™ video shared via DOG engine 104 may proxy the requested back to the YouTube™ platform for playback. Another example would be a link to a new article on a news site or a company's website.

Figure 12:
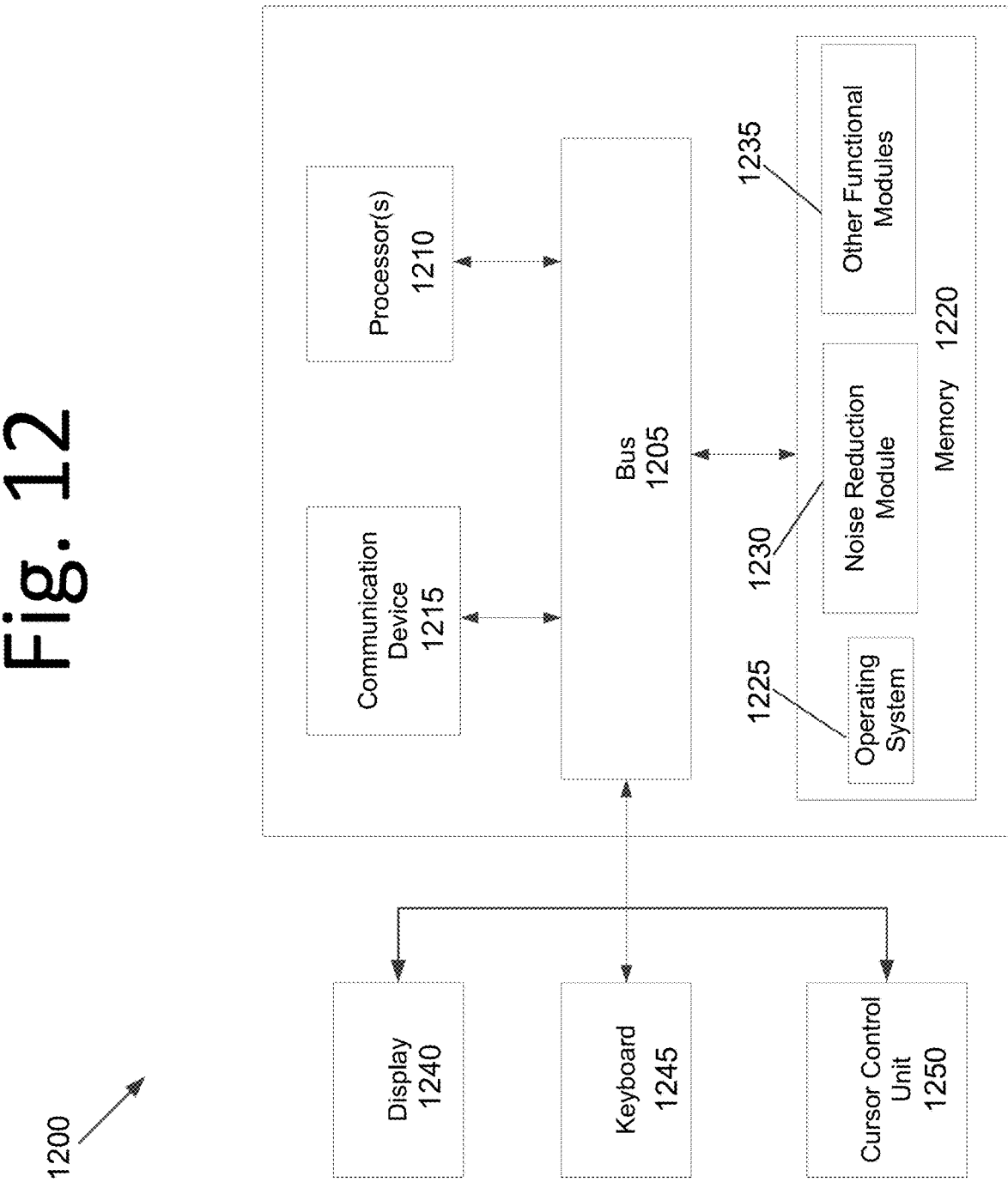
FIG. 12 is a block diagram illustrating a computing system, according to an embodiment of the present invention.

FIG. 12 is a block diagram illustrating a computing system 1200, according to an embodiment of the present invention. Computing system 1000 may include a bus 1005 or other communication mechanism configured to communicate information, and at least one processor 1210, coupled to bus 1205, configured to process information. At least one processor 1210 can be any type of general or specific purpose processor. Computing system 1200 may also include memory 1220 configured to store information and instructions to be executed by at least one processor 1210. Memory 1220 can be comprised of any combination of random access memory ("RAM"), read only memory ("ROM"), static storage such as a magnetic or optical disk, or any other type of computer readable medium. Computing system 1200 may also include a communication device 1215, such as a network interface card, configured to provide access to a network.

The computer readable medium may be any available media that can be accessed by at least one processor 1210. The computer readable medium may include both volatile and nonvolatile medium, removable and non-removable media, and communication media. The communication media may include computer readable instructions, data structures, program modules, or other data and may include any information delivery media.

At least one processor 1210 can also be coupled via bus 1205 to a display 1240, such as a Liquid Crystal Display ("LCD"). Display 1240 may display information to the user. A keyboard 1245 and a cursor control unit 1250, such as a computer mouse, may also be coupled to bus 1205 to enable the user to interface with computing system 1200.

According to one embodiment, memory 1220 may store software modules that may provide functionality when executed by at least one processor 1210. The modules can include an operating system 1225 and DOG module 1230, as well as other functional modules 1235. Operating system 1225 may provide operating system functionality for computing system 1200. Because computing system 1200 may be part of a larger system, computing system 1200 may include one or more additional functional modules 1235 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Some embodiments of the present invention generally pertain to matching and generating one or more types of media from content. Content may be shared by another user of the platform to another social platform, such as Facebook™. Upon sharing the content, a request (or a request back) is submitted to the other social platform for the shared content. In one embodiment, the request is for raw content. Upon receiving the raw data, the raw data is scraped to identify the platform and the best open graph data (or metadata). The identified open graph data instructing the platform on how to show the content and the type of media to be used to show the content.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for dynamic content distribution to a platform, comprising:
receiving, at a dynamic open graph (DOG) engine, a uniform resource locator (URL) of published content from a user computing device;
broadcasting or sharing, by the DOG engine, the URL to one or more platforms outside of the DOG engine, the URL linking back to the published content or a user's homepage;

intercepting, by the DOG engine, a URL request comprising a platform specific user agent variable identifying a requesting platform;

identifying, by the DOG engine, the requesting platform from one or more other platforms by determining if the platform specific user agent variable is identifiable, and dynamically changing published content to be compatible with the requesting platform; and transmitting, from the DOG engine, a link to the requesting platform, the link is for a version of the published content hosted on a source or on the DOG engine if the platform specific user agent variable is identifiable, or forwarding, from the DOG engine, the request to proceed to the source as normal if the platform specific user agent variable is unidentifiable.

2. The computer-implemented method of claim 1, wherein the receiving of the URL of the published content further comprising:

storing, by the DOG engine, the published content in a database by accessing the URL of the published content.

3. The computer-implemented method of claim 1, further comprising:

retrieving, by the DOG engine, the published content from a database, or retrieving, by the DOG engine, the published content from a content provider by accessing the URL of the published content.

4. The computer-implemented method of claim 1, further comprising:

determining, by the DOG engine, a content type of the published content.

5. The computer-implemented method of claim 1, further comprising:

based on the requesting platform, generating, by the DOG engine, the published content from a first format to a second format, such that the second format is compatible with the requesting platform.

6. The computer-implemented method of claim 1, further comprising:

creating, by the DOG engine, a plurality of renditions of the published content based on an analysis of the published content, wherein each of the plurality of renditions are compatible with one or more different platforms.

7. The computer-implemented method of claim 6, further comprising:

returning, by the DOG engine, a corresponding reference for each of the plurality of renditions to a content record, wherein the corresponding reference is in a URL format.

8. A computer program embodied on a non-transitory computer-readable medium, wherein the computer program is configured to cause at least one process to execute:

receiving a uniform resource locator (URL) of published content from a user computing device;

broadcasting or sharing the URL to one or more platforms outside of a DOG engine, the URL linking back to the published content or a user's homepage;

intercepting a URL request comprising a platform specific user agent variable identifying a requesting platform;

identifying the requesting platform from one or more other platforms by determining if the platform specific user agent variable is identifiable and dynamically changing published content to be compatible with the requesting platform; and transmitting a link to the requesting platform, the link is for a version of the published content hosted on a source or on the DOG engine if the platform specific user agent variable is identifiable, or forwarding, from the DOG engine, the request to proceed to the source as normal if the platform specific user agent variable is unidentifiable.

9. The computer program of claim 8, wherein the computer program is further configured to cause at least one execute:

storing the published content in a database by accessing the URL of the published content.

10. The computer program of claim 8, wherein the computer program is further configured to cause at least one execute:

retrieving the published content from a database, or retrieving the published content from a content provider by accessing the URL of the published content.

11. The computer program of claim 8, wherein the computer program is further configured to cause at least one execute:

determining a content type of the published content.

12. The computer program of claim 8, wherein the computer program is further configured to cause at least one execute:

based on the requesting platform, generating the published content from a first format to a second format, such that the second format is compatible with the requesting platform.

13. The computer program of claim 8, wherein the computer program is further configured to cause at least one execute:

creating a plurality of renditions of the published content based on an analysis of the published content, wherein each of the plurality of renditions are compatible with one or more different platforms.

14. The computer program of claim 13, wherein the computer program is further configured to cause at least one execute:

returning a corresponding reference for each of the plurality of renditions to a content record, wherein the corresponding reference is in a URL format.

15. A dynamic content distribution system, comprising:

memory comprising a set of instructions; and at least one processor, wherein the set of instructions are configured to cause the at least one processor to execute:

receiving a uniform resource locator (URL) of published content from a user computing device;

broadcasting or sharing the URL to one or more platforms outside of a DOG engine, the URL linking back to the published content or a user's homepage;

intercepting a URL request comprising a platform specific user agent variable identifying a requesting platform;

identifying the requesting platform from one or more other platforms by determining if the platform specific user agent variable is identifiable, and dynamically changing published content to be compatible with the requesting platform; and transmitting a link to the requesting platform, the link is for a version of the published content hosted on a source or on the DOG engine if the platform specific user agent variable is identifiable, or forwarding, from the DOG engine, the request to proceed to the source as normal if the platform specific user agent variable is unidentifiable.

16. The system of claim 15, wherein the set of instructions are configured to cause the at least one processor to execute:
   storing the published content in a database by accessing the URL of the published content.

17. The system of claim 15, wherein the set of instructions are configured to cause the at least one processor to execute:
   retrieving the published content from a database, or
   retrieving the published content from a content provider by accessing the URL of the published content.

18. The system of claim 15, wherein the set of instructions are configured to cause the at least one processor to execute:
   determining a content type of the published content.

19. The system of claim 15, wherein the set of instructions are configured to cause the at least one processor to execute:
   based on the requesting platform, generating the published content from a first format to a second format, such that the second format is compatible with the requesting platform.

20. The system of claim 15, wherein the set of instructions are configured to cause the at least one processor to execute:
   creating a plurality of renditions of the published content based on an analysis of the published content, wherein each of the plurality of renditions are compatible with one or more different platforms; and
   returning a corresponding reference for each of the plurality of renditions to a content record, wherein the corresponding reference is in a URL format.

* * * * *